(12) United States Patent
Dzwonczyk et al.

(10) Patent No.: US 11,713,748 B2
(45) Date of Patent: Aug. 1, 2023

(54) TRANSMISSION, IN PARTICULAR, A PLANETARY TRANSMISSION

(71) Applicant: AKTIEBOLAGET SKF, Gothenburg (SE)

(72) Inventors: Joanna Stefania Dzwonczyk, Ijsselstein (NL); Thilo von Schleinitz, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 29 days.

(21) Appl. No.: 17/405,377

(22) Filed: Aug. 18, 2021

(65) Prior Publication Data

US 2022/0082089 A1    Mar. 17, 2022

(30) Foreign Application Priority Data

Sep. 14, 2020   (DE) .......................... 102020211521.4

(51) Int. Cl.
| | | |
|---|---|---|
| *F16H 57/08* | (2006.01) | |
| *F03D 15/00* | (2016.01) | |
| *F16H 57/01* | (2012.01) | |
| *F03D 80/70* | (2016.01) | |
| *F16C 17/02* | (2006.01) | |

(52) U.S. Cl.
CPC ............. *F03D 15/00* (2016.05); *F03D 80/70* (2016.05); *F16C 17/02* (2013.01); *F16H 57/01* (2013.01); *F16H 57/08* (2013.01); *F05B 2240/50* (2013.01); *F05B 2260/40311* (2013.01); *F16C 2361/61* (2013.01); *F16H 2057/012* (2013.01); *F16H 2057/085* (2013.01)

(58) Field of Classification Search
CPC .......... F03D 15/00; F03D 80/70; F03D 15/10; F16C 17/02; F16C 2204/10; F16C 2204/34; F16C 17/246; F16C 33/124; F16C 2202/04; F16C 33/14; F16C 2240/60; F16C 33/125; F16C 33/127; F16C 2361/61; F16C 2223/42; F16C 2233/00; F16C 2360/31; F16H 57/01; F16H 57/08; F16H 2057/012; F16H 2057/085; F16H 57/041; F05B 2240/50; F05B 2260/40311; F05B 2240/53; Y02E 10/72

See application file for complete search history.

(56) References Cited

U.S. PATENT DOCUMENTS

| | | | | |
|---|---|---|---|---|
| 4,325,589 A | * | 4/1982 | Hirt | F16H 57/0479 384/375 |
| 8,636,615 B2 | * | 1/2014 | Suzuki | B23P 19/04 475/159 |
| 10,682,705 B2 | * | 6/2020 | Nies | B22F 5/10 |

FOREIGN PATENT DOCUMENTS

| | | | | |
|---|---|---|---|---|
| CA | 3065209 A1 | * | 6/2020 | F16H 1/32 |
| CN | 218094168 U | * | 12/2022 | |
| EP | 3489548 A1 | * | 5/2019 | F01D 25/18 |

* cited by examiner

*Primary Examiner* — Justin Holmes
(74) *Attorney, Agent, or Firm* — J-Tek Law PLLC; Scott T. Wakeman; Mark A. Ussai

(57) ABSTRACT

A planetary transmission for a wind turbine includes a bolt having a cylindrical outer surface and a gear having a cylindrical inner surface rotatably supported on the outer surface of the bolt. The cylindrical outer surface of the bolt and the cylindrical inner surface of the gear are configured to function as a plain bearing, and one or both of these surfaces may include a sliding layer formed from a low friction material.

11 Claims, 2 Drawing Sheets

TRANSMISSION, IN PARTICULAR, A PLANETARY TRANSMISSION

CROSS-REFERENCE

This application claims priority to German patent application no. 10 2020 211 521.4 filed on Sep. 14, 2021, the contents of which are fully incorporated herein by reference.

TECHNOLOGICAL FIELD

The present invention relates to a transmission, in particular a planetary transmission for a wind turbine.

BACKGROUND

Transmissions, in particular planetary transmissions, are used in many applications, such as, for example, in wind turbines or wind power plants. In transmissions, the planetary gears or gears are usually supported via rolling-element bearings that are disposed on bolts, in movable or fixed structures of the transmission, for example, in a circumferential planetary gear carrier or a stationary housing. Alternatively instead of rolling-element bearings, plain bearings can also be used. In this case, instead of the rolling-element bearing, a plain bearing is disposed between a gear and the associated bolt. This plain bearing is pushed onto an axle bolt that carries the gear. In addition, both the axle bolt and the plain bearing must be manufactured with close tolerances; in the case of the plain bearing both outwardly and inwardly with respect to the axle bolt and the planetary gear.

SUMMARY

An aspect of the present disclosure is therefore to make possible a simpler and faster manufacture of a gear bearing assembly and/or of a planetary transmission for, for example, a wind turbine.

The transmission disclosed herein can be used in particular as a planetary transmission in a wind turbine. It includes at least one gear and one bolt that carries the gear. If the transmission is a planetary transmission, the gear represents a planetary gear. The gear is supported via a plain bearing. Instead of using a separate plain bearing, here the outer ring of the plain bearing is formed by the gear and the inner ring of the plain bearing by the bolt. Due to this arrangement an additional element, such as, for example, a sleeve, can be omitted from between the gear and the bolt since these two directly form the plain bearing. The manufacturing can thus be simplified, and the number of elements required for the transmission can be reduced.

According to one embodiment, the gear and/or the bolt includes a sliding layer, sometimes referred to as a low friction layer or coating. Due to this sliding layer, the gear and the bolt can rotate relative to each other with particularly low-friction. Here the sliding layer can be applied on an inner circumference of the gear, an outer circumference of the bolt, or both. Coating of the bolt is particularly preferred, since the outer surface of the bolt can be simpler to coat than the inner surface of the gear.

Here the sliding layer can be applied directly onto the corresponding surface of the bolt or of the gear without it having to be previously processed. In such a case, it is not necessary to achieve the otherwise usual manufacturing accuracy in shape and dimensional tolerances or roughness profile of the bolt or of the gear, or to use a material or a heat treatment having special requirements for the bolt or the gear. After applying the sliding layer, the sliding layer can be ground in order to obtain a corresponding dimension and a surface quality. After the application, the sliding layer can have a thickness of 0.4 to 0.8 mm, and can be ground down by the grinding process to, for example, 0.3 to 0.6 mm. Here the sliding layer can act like a type of sleeve that is directly applied onto the axle bolt.

Instead of directly applying the sliding layer onto the corresponding surface, an adhesion-promoting layer can also first be applied by a cold-spray method and the sliding layer subsequently applied onto this optional adhesion-promoting layer by the cold-spray method. This adhesion-promoting layer can contain, for example, iron or stainless steel. Other metals are also suitable provided they form an optimized adhesion bridge between the substrate of the gear or bolt and the sliding layer.

The sliding layer can be applied by a cold-spray method, in particular a high-pressure cold-spray method. With the cold-spray method, also called cold-spray coating or gas-dynamic cold spraying, a preheated gas jet is generated into which a predominantly metallic powder is fed, which, however, is not melted. The powder can include, for example, white metal, iron, zinc, copper, tin, aluminum, steel, or a combination thereof. If the powder impacts against the corresponding surface, with suitable parameterization the powder fuses to the surface and forms a metal or metal-alloy later.

In contrast to other methods, such as, for example, flame spraying, no thermal load arises on the workpiece that can be detrimental to the properties of the workpiece and the residual stresses of the layer. With the cold spray method, the thermal effect on the workpiece is significantly smaller, whereby the surfaces of the bolt are significantly less affected.

While with flame spraying, a roughened, for example, sandblasted, substrate surface is required, this is not the case with cold spray. However, the bolt simultaneously need not be particularly finely nor particularly precisely processed, since the welded-on cold-spray layer can still subsequently be ground.

As mentioned above, the sliding layer is preferably applied using a high-pressure cold-spray method, preferably at more than 50 bar. In particular the pressure of the gas jet can fall in the range of 50 to 100 bar.

Due to this high pressure, the mixture of gas jet and powder is accelerated via a nozzle to multiple supersonic speed, wherein it is cooled again in the context of the relaxation. Here the particles of the powder in the gas jet impact on the surface of the planetary gear and/or the bolt with high kinetic energy, in particular at a speed of up to 1000 m/s. However, the powder particles here are not hot or molten. Rather, the particles adhere to the surface by local transfer of the kinetic energy, which leads to a type of fusing of the powder onto the surface. A "fusing" is understood here to mean an adhesion that falls far above the values of mechanical interlocking. It can be, for example, a pull-off adhesion value of approximately 50 MPa. This is up to 10 times more than is expected as adhesion from many lacquer systems. The adhesion mechanism in the cold-spray method, in particular high-pressure cold-spray method, is therefore not based on an interlocking of the particles on the surface, as is the case with a flame-spray galvanizing, but rather on a connecting of the powder to the surface, which leads to a significantly higher adhesion than with conventional flame-spray layers. Furthermore, the material of the sliding layer is not melted during the application by the cold-spray method, and is thus also not subjected to oxidation.

Furthermore, the sliding layer applied by the cold-spray method includes few pores. so that a lubricant that is introduced between the planetary gear and the bolt including the sliding layer does not settle into the pores of the sliding layer, whereby it could no longer contribute to the lubrication. At the same time a high contact ratio of the plain bearing surface can be achieved. Instead, the lubricant remains on the sliding layer and serves for lubricating the contact surfaces. With gears it is desired to quickly reach the hydrodynamic region after starting and to separate the sliding layers by an oil film. For this purpose a lubricating oil intake can also be incorporated in the bolt that ends in the central region of the sliding layer as an introduced recess or lubrication pocket, and oil migrates from there out of the rotating gear into the lubrication gap. In order to rapidly form the lubrication film, smooth surfaces able to carry a load are preferred here compared to porous surfaces including lubrication pockets for longer supplying of a mixed friction. The oil supply to the plain bearing can be effected with or without pumping pressure, wherein the pressureless variant is generally preferred due to the lower expense.

The sliding layer is preferably comprised of a material composition. As is explained above, the sliding layer can include white metal (in particular bearing material for plain bearings based on tin or lead), iron, zinc, copper, tin, aluminum, lead, babbitt (in particular bearing material for sliding bearings based on tin, lead, or cadmium), or a combination thereof.

Furthermore, the sliding layer can include at least one first region including a first material composition and a second region including a second material composition, wherein the first and the second material composition are different.

A possible composition is comprised, for example, of 50-70% tin, 10-26% antimony, and 9-20% copper. Another possible composition can be comprised of 70-90% copper and 10-20% aluminum. It should be noted that this composition, and generally the materials mentioned here, are only examples, and other compositions, combinations, and materials are also possible.

During the application of the sliding layer by the cold-spray method, the material composition of the sliding layer is sprayed onto the corresponding surface as powder. This powder can have different material compositions and is adapted depending on the region to be sprayed.

If a cold-spray gun includes two powder supply devices and a control for changing both powder flows, then any combination from a first powder, to a mixture of both powders, to a second powder can be pumped during the running coating process, and the composition of the surface can be varied in a step free manner and continuously. In only one coating passage, for example, a sliding layer can be applied onto the bolt or the gear, which sliding layer is a white metal or babbitt of low hardness in the central region and includes an additional element on both edges to increase the load-bearing capacity.

The transition between the regions can be fluid. Due to the cold-spray method, it is possible to not produce clearly separated regions, but rather to produce a fluid transition or course between the regions. This also ensures a minimization of stresses within the layer, prevents abrupt hardness transitions that could generate inflow grooves and prevents cracking tendencies within the layer. During the application of the sliding layer by the cold-spray method, the powder supply can be changed. In this way a plurality of powders can be applied onto the bolt in different composition.

In particular, the first material composition can be adapted to support sliding properties of the gear and/or of the bolt and the second material composition can be adapted to withstand higher loads and to improve the durability of the gear and/or of the bolt. Such properties can also be combined by using a corresponding material composition that supports both. Here the sliding layer can in particular be only one surface that shows a combination of properties.

Due to the force transmission in the transmission, a gear can be loaded such that it has a slight tendency to tilt. In this case, the gear is not uniformly supported on its axle bolt but rather the edges are more heavily loaded. This support requirement can be taken into account by the sliding layer being adapted variably in its local load capacity specifically due to the cold-spray method.

According to one embodiment, the first region can be disposed between two second regions in the axial extension. For example, the forces in the planetary transmission can lead to a higher load on the ends of the bolt. It is therefore advantageous when the end regions of the bolt are provided with a coating that, in addition to the sliding capacities, shows an increased hardness and thus load-carrying capacity. On the other hand the central region of the bolt can carry a lower load and can therefore include a sliding layer that is less hard and shows better sliding properties for this purpose.

In the edge regions of the bolt, for example, a composition for higher loads can be applied, and in the center a composition for better sliding properties can be applied.

This means that, for example, in the center a material composition is applied that above all contains materials for improving the sliding properties (for example, babbitt/white metal). On the edge regions this material composition can additionally be admixed with a harder metal, such as, for example, copper, in order to reinforce the end regions. The copper proportion of white metals is variable, and the different compositions have different properties and hardnesses. Simply by metering a copper powder, for example, a continuously sprayed-on white-metal layer can be designed harder at its edge regions.

According to a further embodiment, a wear indicator layer can be provided under the sliding layer in order to recognize a wear of the sliding layer. In operation, the sliding layer that is applied onto the wear indicator layer can be worn down over time under unfavorable circumstances. When the sliding layer wears during use, the wear indicator layer lying thereunder is then partially visible. If the wear indicator layer thereby comes into contact with the sliding counter-surface, the wear indicator layer is also worn down. With a lubricant analysis, elements of the wear indicator layer can then be detected in the lubricant of the planetary transmission. If such elements are detected, this is an indication that the sliding layer is worn down, and the corresponding component must either be exchanged or the sliding layer must be renewed. This embodiment thus makes it possible to carry out a continuous or intermittent verification of the bearing points of the transmission without having to dismantle the transmission or even only having to stop it. Provided no corresponding indicator element is present in the lubricant, it can be assumed without doubt that all bearing points are in order.

Alternatively or additionally the wear indicator layer can be dyed or have a different color than the above-lying sliding layer. Due to such a color difference, wear can also be recognized by visual examination if, for example, the transmission is dismantled.

The wear indicator layer is preferably a layer that also exhibits sliding (low friction) properties in order to maintain a low-friction sliding between the planetary gear and the bolt even with wearing down of the actual sliding layer. The wear indicator layer is preferably identical to the base or adhesion-promoting layer that is applied between substrate, i.e., bolt or gear, and the sliding layer for increasing the adhesion.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
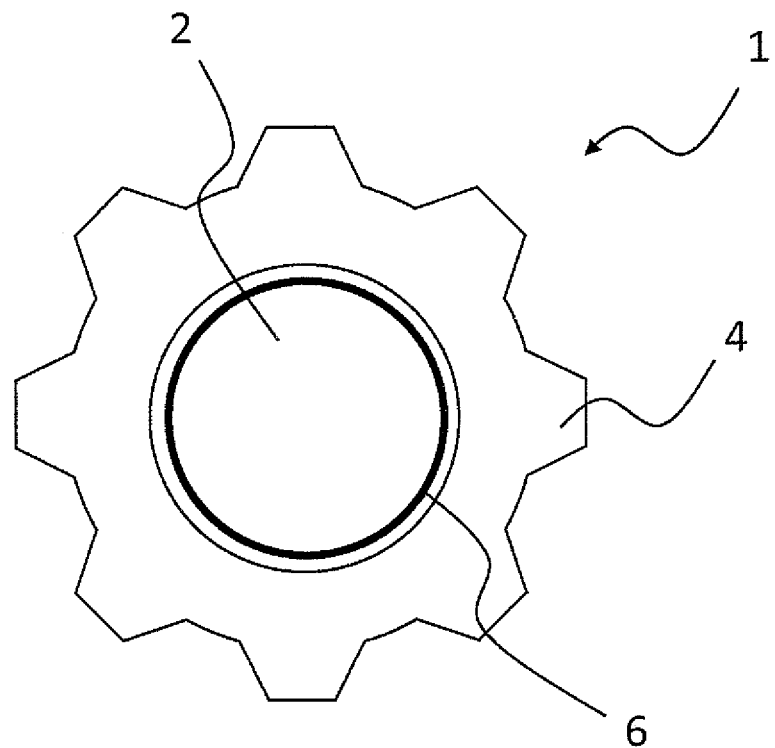
FIG. 1 is a schematic sectional view of a plain bearing of a transmission or planetary transmission according to an embodiment of the present disclosure.

FIG. 1 shows a schematic sectional view of a part of a transmission, for example, of a planetary transmission for a wind turbine, for example. In the following the transmission is described only in connection with the use as planetary transmission. However, the description applies in an identical manner for any transmission including a gear that is carried by a bolt.

The planetary transmission includes at least one bolt 2 and at least one planetary gear 4 that is carried by the bolt 2. Here the planetary gear 4 serves as an outer ring of the plain bearing 1 and the bolt 2 as an inner ring of the plain bearing 1 so that the planetary gear 4 is thus supported via a plain bearing 1 that is formed by the planetary gear 4 and the bolt 2.

In order to ensure the sliding properties of the plain bearing 1, either the bolt 2 or the planetary gear 4 or both includes a sliding layer 6. In the embodiment shown here, the sliding layer 6 is applied onto the bolt 2. The sliding layer 6 is preferably applied directly onto the bolt 2 using a cold-spray method.

The sliding layer 6 can be applied in particular with a thickness of 0.4 to 0.8 mm onto the bolt 2, and subsequently the bolt 2 including the sliding layer 6 can be ground in order to reach a surface thickness of 0.3 to 0.6 mm. Due to such a grinding process, on the one hand the size of the bolt 2 can be adapted to the planetary gear 4, and on the other hand it can be ensured that the sliding layer 6 has a smooth surface in order to make possible a sliding of the planetary gear 4 around the bolt 2. Here the sliding layer 6 assumes the function of a sleeve between the planetary gear 4 and the bolt 2.

The sliding layer 6 can include different material compositions as is described in the following with reference to FIGS. 2 to 5.

Figure 2:
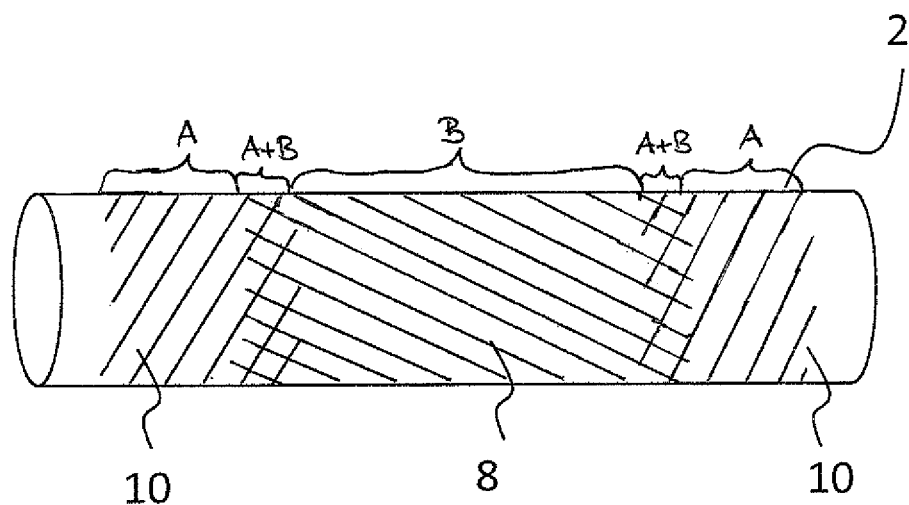
FIG. 2 is a schematic perspective view of a bolt for the plain bearing of FIG. 1.

FIG. 2 shows a perspective view of a bolt 2 that includes different regions 8, 10 of a sliding layer 6 (not explicitly shown in FIG. 2). Such different regions are also possible in an analogous manner on the planetary gear 4 when the sliding layer 6 is applied onto the planetary gear 4.

In operation, a higher load can result on the bolt 2 in the edge regions 10 than in the central region 8. In order to better withstand this load distribution, the edge regions 10 can be provided with a sliding layer 6 having a higher hardness, and the central region 8 can include a sliding layer 6 having a lower hardness and better sliding properties for this purpose. The sliding layer can include, for example, white metal, iron, zinc, copper, tin, aluminum, lead, babbitt, or a combination thereof.

As is mentioned above, the sliding layer 6 is applied using a cold-spray method. Here a powder that can include different material compositions is sprayed with high pressure onto a surface, here onto the bolt 2. During the spraying, the material composition of the powder can be adapted arbitrarily so that in particular a smooth transition can be present between the regions 8, 10, without any hard transitions or separate regions.

As is shown here by way of example, the sliding layer 6 in the edge regions 10 is comprised of a material composition A, in the central region 8 of a material composition B, and in the transition regions between the regions 8 and 10 of a material composition A+B. Both the material composition A and the material composition B preferably include the same material having sliding properties, such as, for example, white metal, but in different proportions. In the edge regions 10, a material composition, for example, an even harder metal, for example, copper, can be added to the material composition A in order to withstand the higher loads that occur in the edge regions 10. Other divisions of the regions 8, 10, or more or fewer regions are also possible.

In addition to a sliding layer 6, a wear indicator layer 12 can be applied between the bolt 2 (or the planetary gear 4) and the sliding layer 6. Such a wear indicator surface 12 serves to show a wear of the sliding layer 6. This can be effected either by inspection during a dismantling of the planetary transmission or by an analysis of the lubricant composition, since when the sliding layer 6 wears down, particles of the wear indicator layer 12 can be detected in the lubricant.

Figure 3:
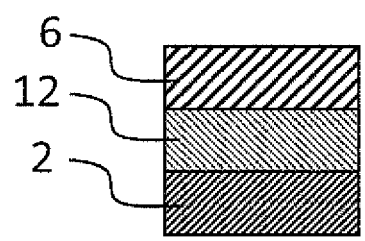
FIGS. 3-5 are a schematic views of a layer structure of the plain bearing of FIG. 1.
Figure 4:
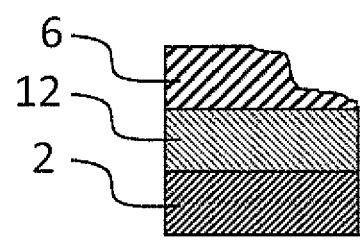
Figure 5:
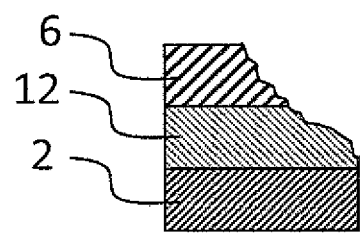

As is shown in FIG. 3, the wear indicator layer 12 is first applied onto the bolt 2 (or the planetary gear 4), and then the sliding layer 6 is applied onto the wear indicator layer 12. When the sliding layer 6 is worn down, as is the case in operation by a sliding between the planetary gear 4 and the bolt 2, the sliding layer 6 becomes thinner (see FIG. 4). As soon as the sliding layer 6 is further removed, a contact arises between the planetary gear 4 (or the bolt 2) and the wear indicator layer 12, whereby the wear indicator layer 12 also starts to be removed, as is shown in FIG. 5. In this state, elements of the wear indicator layer 12 can be detected in the lubricant, which indicates that the sliding layer 6 is at least no longer completely present. In this way an exchange of the bolt 2 or the planetary gear 4 or a renewal of the sliding layer 6 can already be effected early in order to prevent a damage to the bolt 2 and to the planetary gear 4.

Alternatively or additionally a wearing down of the sliding layer 6 can also be visually detected, for example, by a different coloration of the sliding layer 6 and the wear indicator layer 12.

Due to the above-described planetary transmission including a plain bearing, it is possible in a simple manner to support a planetary gear directly on a bolt. Since the sliding layer is disposed directly on the bolt or the planetary gear, fewer components are required, and those components requires a lower material, dimensional, and surface quality, whereby the manufacturing is simplified and the costs are reduced.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved plain bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Plain bearing
2 Bolt
4 Gear
6 Sliding layer
8 First region
10 Second region
12 Wear-indicator layer

What is claimed is:

1. A planetary transmission for a wind turbine, comprising:
    a bolt having a cylindrical outer surface, and
    a planetary gear having a cylindrical inner surface rotatably supported on the outer surface of the bolt,
    wherein the cylindrical outer surface of the bolt and the cylindrical inner surface of the planetary gear are configured to function as a plain bearing,
    wherein the inner surface of the planetary gear and/or the outer surface of the bolt includes a sliding layer, and
    wherein the sliding layer is a cold sprayed layer having a material composition different than a material composition of the planetary gear and a material composition of the bolt.

2. A planetary transmission for a wind turbine, comprising:
    a bolt having a cylindrical outer surface, and
    a planetary gear having a cylindrical inner surface rotatably supported on the outer surface of the bolt,
    wherein the cylindrical outer surface of the bolt and the cylindrical inner surface of the planetary gear are configured to function as a plain bearing,
    wherein the inner surface of the planetary gear and/or the outer surface of the bolt includes a sliding layer, and
    wherein the sliding layer is a cold sprayed layer with a first region having a first material composition and at least one second region having a second material composition different than the material composition of the first region.

3. The planetary transmission according to claim 2, wherein the first material composition has a first hardness and the second material composition has a second hardness greater than the first hardness.

4. The planetary transmission according to claim 3, wherein the at least one second region comprises a first second region and a second second region, and
    wherein the first region is axially disposed between the first second region and the second second region.

5. The planetary transmission according to claim 2, wherein the inner surface of the planetary gear includes the sliding layer, and
    including a wear indicator layer between the sliding layer and the inner surface of the gear.

6. The planetary transmission according to claim 2, wherein the outer surface of the bolt includes the sliding layer, and
    including a wear indicator layer between the sliding layer and the outer surface of the bolt.

7. The planetary transmission according to claim 2, wherein the first region comprises white metal or babbitt,
    wherein the first region includes no copper or a first weight percent copper,
    wherein the second region comprise white metal or babbitt, and
    wherein the second region includes a second weight percent copper, the second weight percent being greater than the first weigh percent.

8. The planetary transmission according to claim 2, wherein the first region comprises babbitt having a first percentage of copper, and
    wherein the second region comprises babbitt having a second percentage of copper, the second percentage being greater than the first percentage.

9. A planetary transmission for a wind turbine, comprising:
    a bolt having a cylindrical outer surface, and
    a gear having a cylindrical inner surface rotatably supported on the outer surface of the bolt,
    wherein the inner surface of the gear and/or the outer surface of the bolt includes a sliding layer of babbitt,
    wherein the sliding layer of babbitt includes a first region axially located between two second regions, and
    wherein an amount of copper in the babbitt in the second regions is greater than an amount of copper in the babbitt in the first region.

10. The planetary transmission according to claim 9, wherein the inner surface of the gear includes the sliding layer of babbitt.

11. The planetary transmission according to claim 9, wherein the outer surface of the bolt includes the sliding layer of babbitt.

* * * * *